United States Patent Office 3,541,865
Patented Nov. 24, 1970

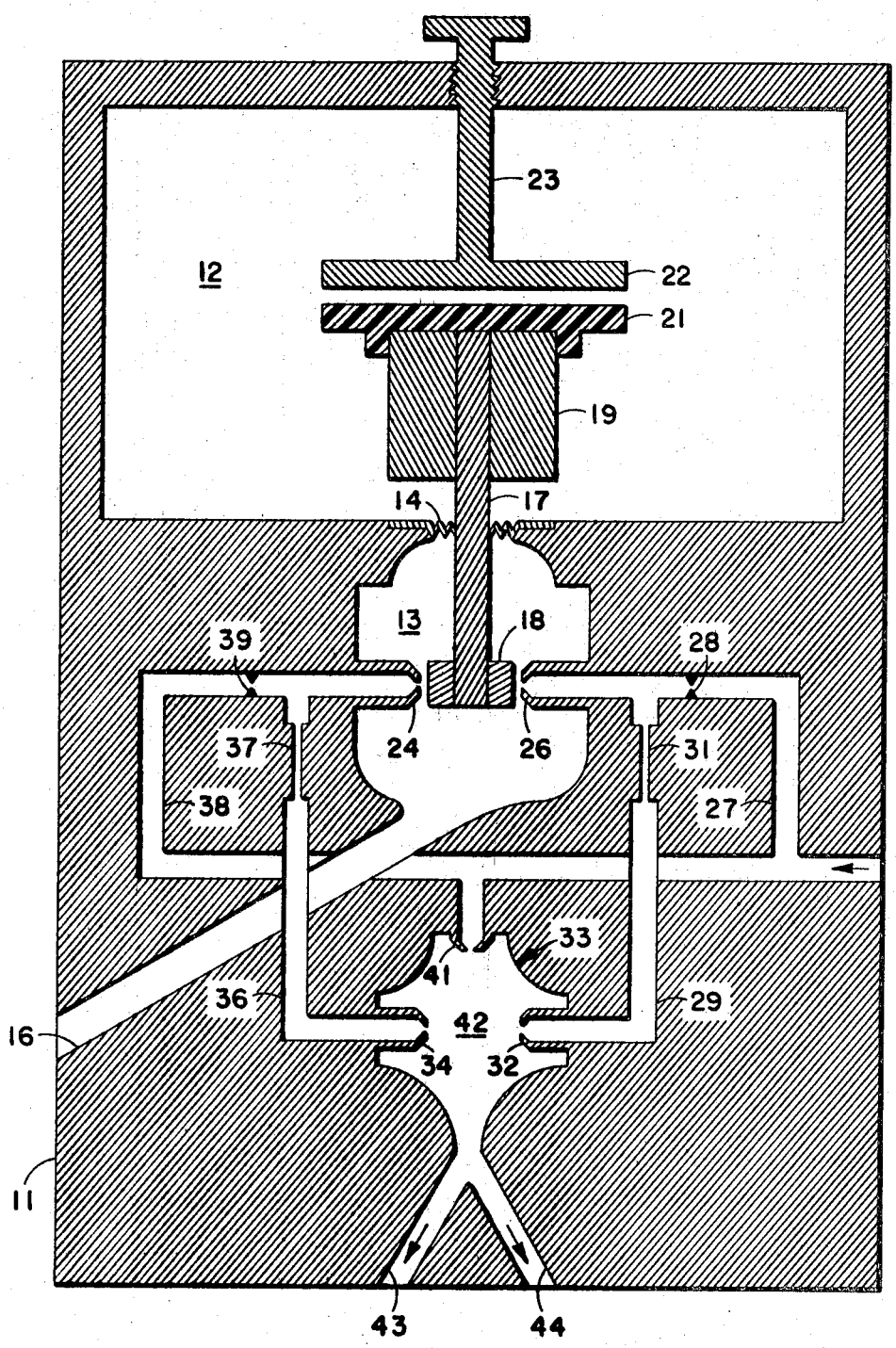

3,541,865
FLUID ACCELEROMETER
Larry T. Brown, Warren, Mich., assignor to LTV Aerospace Corporation, Dallas, Tex., a corporation of Delaware
Filed Apr. 19, 1967, Ser. No. 632,029
Int. Cl. G01p 15/02
U.S. Cl. 73—515         5 Claims

ABSTRACT OF THE DISCLOSURE

A fluid accelerometer includes a housing enclosing first and second chambers which are separated by a flexible diaphragm. A shaft extends through the diaphragm and is affixed thereto at a juncture point spaced from its ends such that the shaft is free to pivot about the juncture point. An inertial weight is affixed to one end of the shaft and disposed within the first chamber, the first chamber also containing a fluid for damping movement of the shaft and inertial weight. A fluid amplifier has sensing nozzles disposed within the second chamber end adjacent the shaft for measuring pivotal movement of the shaft occurring in response to acceleration.

---

This invention relates to a device for detecting acceleration and in particular to an accelerometer for use with a fluidic control system using either a compressible or incompressible fluid.

The use of fluidic analog computers employing active units such as fluid analog amplifiers and fluid logic units has created a need for primary measuring devices having fluidic output signals. The need for primary measuring devices in the area of acceleration measurement is particularly acute since most accelerometers available today generate electrical output signals. Although accelerometers that generate electrical signals have excellent operating characteristics, the need for an electric-to-fluidic converter where a fluidic control signal is required introduces additional apparatus and the chance of additional error.

Fluid accelerometers that are presently available and have a pneumatic output usually employ an inertial mass mounted at the end of a hollow flexible tube connected to an air supply. An acceleration force acting on the inertial mass causes it to be displaced, thereby causing the flexible tube to bend. As the flexible tube bends, the air passing through said tube is deflected into a plurality of receiving passages, the magnitude of the measured acceleration being proportional to the amount of air passing through a given receiving passage. The inherent disadvantage of such an acceleration measuring device is the lack of means for controlling the oscillation of the inertial weight. Further, the spacing between the output end of the hollow flexible tube and the receiving passages is critical, thus requiring costly machining and adjusting procedures.

In accordance with one embodiment of the invention, an inertial weight is pivotally mounted such that movement of the weight varies the spacing between a target and opposing sensing nozzles connected to a supply of operating fluid. Movement of the target between the opposing sensing nozzles causes the fluid pressure to increase at one nozzle and decrease at the other. Thus, the pressure differential at the sensing nozzles is proportional to the magnitude of the measured acceleration. By connecting one sensing nozzle to one control nozzle of an analog fluid amplifier and connecting the second sensing nozzle to another control nozzle of the fluid amplifier, a very low level of applied acceleration can be converted into a differential output signal, amplified, and used as a fluid control signal that is proportional to the magnitude of the measured acceleration.

A major object of this invention is to provide an accelerometer having a fluidic output signal.

Another object of this invention is to provide an accelerometer having means for controlling the oscillations of the inertial weight.

Yet another object of this invention is to provide an accelerometer not requiring costly machining and adjusting procedures.

Other objects and advantages will be apparent from the specification and claims and the accompanying drawing illustrative of the invention.

The drawing is a sectional view of an accelerometer wherein the differential pneumatic output signal controls the output of an analog fluid amplifier.

Referring to the drawing, there is shown a housing 11 including the fluid accelerometer of this invention and a proportional fluid amplifier. The housing 11 has a main chamber 12 filled with a fluid, such as a silicone oil, for damping the oscillations of the inertial weight and thus the damping ratio of the subject accelerometer. The main chamber 12 is separated from a nozzle chamber 13 by means of a diaphragm 14. A drainpipe 16 prevents fluid from accumulating in the nozzle chamber 13. Pivotally mounted through the center of the diaphragm 14 is a connecting rod 17 having a target 18 affixed to its lowest end and an inertial weight 19 mounted to the rod in the main chamber 12. The inertial weight 19 is capped with a damping member or disc 21 of any lightweight material such as plastic. Mounted in an adjustably spaced relationship with the damping disc 21 is a damping body or disc 22. The space between the two damping discs 21 and 22 is adjusted by means of a rod 23 threaded to an opening in the main chamber 12.

Positioned at opposite ends of the target 18, in the nozzle chamber 13, are two sensing nozzles 24 and 26. Sensing nozzle 26 is supplied with an operating fluid, such as air or hydraulic fluid, from a source (not shown) through a passage 27. A restrictive device 28, mounted in the passage 27, maintains a constant flow of fluid through the sensing nozzle 26 and thus serves as a fixed resistor in a 4-way bridge formed by restrictive devices 28, 39 and sensing nozzles 24, 26. Connected to the passage 27, at a point between the sensing nozzle 26 and the restrictive device 28, is a passage 29 having a laminar restrictive device 31 as a part thereof. The passage 29 terminates at one control nozzle 32 of an analog fluid amplifier 33. It should be pointed out that the accelerometer of this invention could be connected to a control apparatus other than the fluid amplifier 33. The sensing nozzle 24 is similarly connected to a control nozzle 34 of the fluid amplifier 33 by means of a passage 36 having a laminar restrictive device 37 as a part thereof. The sensing nozzle 24 is supplied with an operating fluid, such as air or hydraulic fluid from the same source as the sensing nozzle 26, by means of a passage 38. A restrictive device 39, mounted in the passage 38 before the passage 36, is used as the second fixed resistor in the 4-way bridge and maintains a constant fluid flow through the sensing nozzle 24.

Fluid amplifiers of a type shown in the drawing are well known devices finding increasing application in modern missile and industrial controls. The fluid amplifier 33 has, in addition to the control nozzles 32 and 34, a power nozzle 41 connected to a source of operating fluid by means of the passage 38. The two control nozzles 32 and 34 are mounted approximately at right angles to the power nozzle 41 in an interaction chamber 42. The operating fluid flowing from the power nozzle 41 passes through the interaction chamber 42 into one of two output passages 43 or 44, depending upon the pressure differential developed at the control nozzles 32 and 34.

In operation, the target 18 is adjusted such that the spacing between the left face of the target 18 and the sensing nozzle 24 is equal to the spacing between the right face of the target and the sensing nozzle 26 with the inertial weight 19 at its zero acceleration position. If the size of the restrictive devices 28 and 29 are equal and the sensing nozzles 24 and 26 are supplied from the same source of operating fluid, a zero pressure differential will exist between the control nozzles 32 and 34 during zero acceleration conditions.

Assume an acceleration force is developed in a direction of the arrow shown in the main chamber 12. The inertial weight 19 will rotate in a counter-clockwise direction with the diaphragm 14 as the pivot point. The counter-clockwise rotation of the inertial weight 19 causes the target 18 to also rotate counter-clockwise, thereby changing the spacing between the target and the sensing nozzles 24 and 26. A counter-clockwise rotation of the target 18 decreases the spacing between the sensing nozzle 26 and the target 18 and increases the spacing between sensing nozzle 24 and the target. Since the pressure developed at the sensing nozzles is inversely proportional to the spacing between the nozzle and the target, the pressure at the sensing nozzle 26 will increase and the pressure at the sensing nozzle 24 will decrease. The magnitude of the pressure differential developed at the sensing nozzles is proportional to the magnitude of the acceleration force. Thus, an acceleration force of several g's results in a large pressure differential while a fractional acceleration force develops small pressure differential. The curve of pressure differential versus acceleration force is linear for both increasing and decreasing forces of acceleration. Since the control nozzles 32 and 34 are connected to the sensing nozzles 26 and 24 respectively, a pressure differential will be developed across the control nozzles that is proportional to the pressure differential across the sensing nozzles.

The operation of the analog fluid amplifier 33 is well known. A supply of high pressure operating fluid enters the interaction chamber 42 through the power nozzle 41 and leaves the chamber through either the passage 43, the passage 44, or partially through both, depending upon the magnitude and polarity of the pressure differential at the control nozzles 32 and 34. If the pressure differential between the two control nozzles 32 and 34 is zero, then the power stream from the power nozzle 41 will divide equally between the passages 43 and 44. Since the control nozzles 32 and 34 produce jets of fluid that impinge on and deflect the power jet, a pressure differential between the control nozzles causes the power jet to be deflected either to the left or to the right. In a proportional fluid amplifier, flow and pressure at the output passages 43 and 44 depends on the power jet strength and direction of flow. Because the direction of flow through the output passages 43 and 44 is controlled by the low-energy jets from the control nozzles 32 and 34, the output from the passages 43 and 44 is a pressure differential proportional to the pressure differential at the control nozzles. Thus, the output of an analog fluid amplifier is a pressure differential existing between its two output ports and proportional to the differential existing between its control nozzles. In a proportional fluid amplifier, the walls of the interaction chamber are positioned relatively far from the regions where the control jets meet the power jets. If the walls are positioned adjacent to the interaction region the power stream will have a marked tendency to attach to one of the walls thereby resulting in a bi-stable fluid amplifier, i.e., a fluid amplifier tending to produce only two stable output values.

With an acceleration force developed in the direction of the arrow in the main chamber 12, the pressure at the control nozzle 32 will be greater than the pressure at control nozzle 34 and the power stream will be deflected to exit mainly from the passage 43 rather than from the passage 44. As the acceleration force returns to zero, the inertial weight 19 returns to its zero acceleration position and the spacing between the sensing nozzles 24 and 26 and the target 18 is again equal. The pressure differential between the sensing nozzles 24 and 26 and between the contrl nozzles 32 and 34 will be zero. The power stream from the power nozzle 41 will pass from the interaction chamber 42 and divide equally between the pasages 43 and 44.

An acceleration force in a direction opposite to the arrow shown in the main chamber 12 causes the inertial weight 19 to rotate in a clockwise direction, thereby decreasing the pressure at the sensing nozzle 26 and increasing the pressure at the sensing nozzle 24. The differential pressure developed across the sensing nozzles 24 and 26 will again be proportional to the magnitude of the acceleration force but opposite in polarity from the differential developed when the acceleration force was in the direction of the arrow. Similarly, the pressure differential developed across the control nozzles 32 and 34 will be proportional to the magnitude of the acceleration force but opposite in polarity to the differential developed in the previous example. The pressure differential now acting on the power stream, exiting from the power nozzle 41, will cause the power stream to be deflected more to the passage 44 than to the passage 43. A return of the inertial weight 19 to its zero acceleration position will again cause the power stream from the power nozzle 41 to be divided equally between the passages 43 and 44.

Thus, an acceleration force in the direction of the arrow in the main chamber 12 causes a pressure differential to be developed between the passages 43 and 44 that is proportional to the magnitude of the acceleration with the pressure at the passage 43 greater than the pressure at the passage 44. An acceleration force in a direction opposite to the arrow shown in the main chamber 12 causes a pressure differential to be developed between the passages 44 and 43 wherein the pressure at the passage 44 is greater than the pressure at the passage 43.

A unique feature of this accelerometer is that the damping ratio of the device is controllable and can be easily varied from a lightly damped to highly overdamped value depending on the degree of damping required in the intended application of the device. The lightweight damping disc 21 affixed to inertial weight 19 in conjunction with the damping fluid is used in controlling the damping ratio of the device. The boundary layer friction between the surface of the damping disc 21 and the fluid enclosed within the main chamber 12 is usually sufficient to obtain damping ratios greater than unity. However, a further damping effect is possible by means of the adjustable damping disc 22. By varying the spacing between the damping disc 21 and the damping disc 22, the boundary layer friction can be increased, thereby increasing the damping effect.

It is not essential for the successful operation of the accelerometer of this invention that the differential output therefrom be connected to an analog fluid amplifier as shown in the drawing. One obvious substitution of the analog fluid amplifier 33 would be a bi-stable fluid amplifier connected to a digital pneumatic or hydraulic computer. Such a use, however, would not take full advantage of the substantially linear pressure differential developed between the sensing nozzles 24 and 26.

Although only one embodiment of the invention has been described in detail herein and shown in the accompanying drawing, it will be evident that various further modifications are possible in the arrangement and construction of its components without departing from the scope of the invention.

I claim:
1. A fluid accelerometer comprising:
a housing enclosing a cavity;
a diaphragm connected to said housing and dividing chambers, the first chamber being filled with a damping fluid;
a shaft passing through the center of said diaphragm and having a first end positioned within the first chamber and a second end positioned within the second chamber;
an inertial weight mounted to the first end of said shaft in the first chamber of said housing;
a target fixed to the second end of said shaft in the second chamber of said housing;
first and second sensing nozzles mounted in opposed positions in the second chamber of said housing on opposite sides of said target; and
a fluid amplifier having a first control means connected to said first sensing nozzle and a second control means connected to said second sensing nozzle.

2. A fluid accelerometer as set forth in claim 1, further comprising a damping member affixed to said inertial weight for interacting with the damping fluid in said first chamber.

3. A fluid accelerometer as set forth in claim 2, wherein said damping member has a substantially flat surface disposed perpendicular to the major axis of said shaft and facing away from said shaft and said diaphragm.

4. The fluid accelerometer as set forth in claim 2, further comprising a damping body connected to said housing and confronting the flat surface of said damping member and moveable toward and away from said damping member flat surface for selectively adjusting the damping of said inertial weight.

5. The fluid accelerometer of claim 4, wherein said damping body is threadingly connected to said housing and threadingly moveable toward and away from the flat surface of said damping member for selectively controlling the damping of said inertial weight.

References Cited

UNITED STATES PATENTS

| | | | |
|---|---|---|---|
| 2,502,132 | 3/1950 | Efromson et al. | 73—518 XR |
| 2,944,526 | 7/1960 | Jarvis | 73—514 XR |
| 3,042,343 | 7/1962 | Cooke et al. | 73—515 XR |
| 2,959,252 | 11/1960 | Jamieson. | |

FOREIGN PATENTS 669,829  1/1939  Germany.

OTHER REFERENCES

An article by O. L. Wood entitled "Design Guide—Pure Fluid Devices," from Machine Design, June 1965, pp. 154–180, page 160 relied upon.

JAMES J. GILL, Primary Examiner

U.S. Cl. X.R.

137—81.5